United States Patent [19]

Asada et al.

[11] Patent Number: 5,133,229
[45] Date of Patent: Jul. 28, 1992

[54] SHIFT CONTROL SYSTEM AND METHOD FOR AUTOMATIC TRANSMISSION OF VEHICLES

[75] Inventors: Toshiyuki Asada, Toyota; Yasuo Hojo; Hideo Tomomatsu, both of Nagoya, all of Japan

[73] Assignee: Toyota Jidosha Kabushiki Kaisha, Toyota, Japan

[21] Appl. No.: 655,845

[22] Filed: Feb. 14, 1991

[30] Foreign Application Priority Data

Feb. 16, 1990 [JP] Japan .................................. 2-35960

[51] Int. Cl.⁵ ............................................. B60K 41/18
[52] U.S. Cl. .......................................... 74/866; 74/867; 364/424.1
[58] Field of Search .............. 74/866, 867; 364/424.1

[56] References Cited

U.S. PATENT DOCUMENTS

| | | | |
|---|---|---|---|
| 4,928,557 | 5/1990 | Takada et al. | 74/866 X |
| 4,953,091 | 8/1990 | Baltusis et al. | 74/866 X |
| 5,010,787 | 4/1991 | Takada et al. | 74/867 OR |
| 5,012,698 | 5/1991 | Hayasaki | 74/866 OR |
| 5,033,330 | 7/1991 | Okahara | 74/866 X |

Primary Examiner—Rodney H. Bonck
Assistant Examiner—Daniel Wittels
Attorney, Agent, or Firm—Oblon, Spivak, McClelland, Maier & Neustadt

[57] ABSTRACT

A shift control system for use in an automatic transmission having a gear train to be set to a plurality of gear stages of different gear ratios in accordance with the engagement/release states of a plurality of frictional engagement devices. The gear train is enabled to set a predetermined gear stage in accordance with plural kinds of combination of the engagement/release of the frictional engagement devices. The shift control system comprises: an input torque detector for detecting input torque to be inputted to the gear train; a torque evaluator for evaluating the level of the input torque; and an engagement/release pattern selector for selecting the combination of engagement/release of the frictional engagement devices for setting the predetermined gear stage, on the basis of the result of the input torque evaluated by the torque evaluator.

17 Claims, 6 Drawing Sheets

SHIFT CONTROL SYSTEM AND METHOD FOR AUTOMATIC TRANSMISSION OF VEHICLES

BACKGROUND OF THE INVENTION

1. Field of the Invention

The present invention relates to an automatic transmission to be used in a vehicle such as an automobile and, more particularly, to an automatic transmission for setting a plurality of gear stages by frictional engagement means such as clutches and brakes.

2. Discussion of the Related Art

An automatic transmission to be mounted on a vehicle such as an automobile is desired to have a small size and a light weight, to facilitate control of its shifts, to have low shifting shocks and to be able to set a number of gear stages at proper gear ratios. In order to increase the number of gear stages to be set, it is sufficient to increase the number of planetary gear sets composing the gear train or the increase the number of frictional engagement means such as clutches or brakes so that the connections and stationary states of the rotary components of the gear train may be changed in various manners. We have already proposed an automatic transmission which is enabled to have major gear stages of forward 1st to 5th speeds having gear ratios of geometric series and reverse one speed thereby to set intermediate stages between the 2nd and 3rd speeds and between the 3rd and 4th speeds by composing the gear train majorly of three planetary gear sets. In the automatic transmission thus proposed, the connections and stationary states of the components of the planetary gear sets composing the gear train can be diversified so that the number of gear stages to be set can be increased while providing a plurality of kinds of combination patterns of engagement/release (i.e., engagememt/release patterns) of the frictional engagement means for setting a predetermined one of gear stages. In some engagement/release pattern, the rotary components may have their numbers of revolution varied or unvaried. As a result, the shifting shocks, the shift controllability, and the durability of the frictional engagement means are seriously influenced by the manner how to select the frictional engagement means for setting a predetermined gear stage. Therefore, we have already proposed a shift control method for an automatic transmission capable of selecting a plurality of engagement/release patterns for setting a predetermined gear stage. By this method, the gear stage is set by selecting such one of plural kinds of engagement/release patterns as to reduce load torque to be applied to the frictional engagement means, as disclosed in Japanese Patent Application No. Hei 1-267257.

The load torque to be applied to the frictional engagement means for setting a predetermined gear stage by changing the transmission passages of the drive force in the gear train composed of a plurality of planetary gear sets can be determined as a ratio to input torque inputted to the gear train, on the basis of the gear ratio (i.e., the ratio between the tooth number of a sun gear and the tooth number of a ring gear) of each planetary gear set. In our above-specified method, the gear stage is set by selecting such an engagement/release pattern as to reduce that ratio. In case a shift is to be carried out, on the other hand, the shift controllability has to be improved with less shifting shocks by operating a one-way clutch to execute the shift or by operating the frictional engagement means equipped with an accumulator.

Incidentally, the load torque to be applied to each frictional engagement means can be grasped as the ratio to the input torque, as described above. Since, however, the actual load torque is varied with the input torque, it may raise no problem in case the input torque is low, even if the ratio to the input torque is great.

Even in case the input torque is low, it is conceivable to execute the aforementioned method according to our proposal so that the engagement/release pattern is selected by considering the shift controllability. Then, no serious problem will arise for practical purposes, but an unnecessary control is performed by changing the frictional engagement means after or before the shift, so that the controls for the shift are disadvantageously complicated.

If, on the other hand, the engagement/release pattern for reducing the load torque is selected, it is possible to reduce the size of the frictional engagement means and to improve their durability. However, the transmission torque capacity of the frictional engagement means is determined by the oil pressure supplied, and the control oil pressure is reduced in case the ratio of the load torque is low. As a result, there arises another problem that the necessary control oil pressure is too low to control or that the control accuracy deteriorates, in case the input torque is low. Thus, the method of determining the engagement/release pattern with reference to the load torque cannot be applied to all the situations.

SUMMARY OF THE INVENTION

An object of the present invention is to make effective use of plural kinds of combinations of engagement/release of the frictional engagement means for setting a predetermined gear stage.

Another object of the present invention is to prevent the load torque to be applied to the frictional engagement means from becoming excessive to improve the durability of the frictional engagement means by changing the combination of engagement/release of the frictional engagement means for setting the predetermined gear stage, in accordance with the magnitude of the input torque.

Still another object of the present invention is to facilitate the shift control by selecting a combination having an advantage for the shift control as that of engagement/release of the frictional engagement means for setting the predetermined gear stage, in case input torque is low.

According to one feature of the present invention, there is provided a shift control system for use in an automatic transmission which has a gear train to be set to a plurality of gear stages of different gear ratios in accordance with the engagement/release states of a plurality of frictional engagement means. The gear train is enabled to set a predetermined gear stage in accordance with plural kinds of combination of the engagement/release of said frictional engagement means. The shift control system comprises: input torque detection means for detecting input torque to be inputted to said gear train; torque evaluation means for evaluating the level of said input torque; and engagement/release pattern selection means for selecting the combination of engagement/release of said frictional engagement means for setting said predetermined gear stage, on the basis of the result of the input torque evaluated by said torque evaluation means.

In the shift control system of the present invention, moreover, said engagement/release pattern selection means is adapted to select, in case said input torque is high, the combination of engagement/release of said frictional engagement means, in which the ratio of the load torque to be applied to the frictional engagement means to be engaged to said input torque is low.

In the shift control system of the present invention, still moreover, said engagement/release pattern selection means is adapted to select, in case said input torque is low, the combination of engagement/release of said frictional engagement means, in which the ratio of the load torque to be applied to the frictional engagement means to be engaged to said input torque is high.

According to another feature of the present invention, there is provided a shift control method for use in an automatic transmission which has a gear train to be set to a plurality of gear stages of different gear ratios in accordance with the engagement/release states of a plurality of frictional engagement means. The gear train is enabled to set a predetermined gear stage in accordance with plural kinds of combination of the engagement/release of said frictional engagement means. The shift control method comprises: an input torque detection step of detecting input torque to be inputted to said gear train; a torque evaluation step of evaluating the level of said input torque; and an engagement/release pattern selection step of selecting the combination of engagement/release of said frictional engagement means for setting said predetermined gear stage, on the basis of the result of the input torque evaluated by said torque evaluation means.

In the shift control method of the present invention, moreover, said engagement/release pattern selection step selects, in case said input torque is high, the combination of engagement/release of said frictional engagement means, in which the ratio of load torque to be applied to the frictional engagement means to be engaged to said input torque is low.

In the shift control method of the present invention, still moreover, said engagement/release pattern selection step selects, in case said input torque is low, the combination of engagement/release of said frictional engagement means, in which the ratio of the load torque to be applied to the frictional engagement means to be engaged to said input torque is great.

The above and further objects and novel features of the present invention will more fully appear from the following detailed description when the same is read in connection with the accompanying drawings. It is to be expressly understood, however, that the drawings are for the purpose of illustrations only and are not intended as a definition of the limits of the invention.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
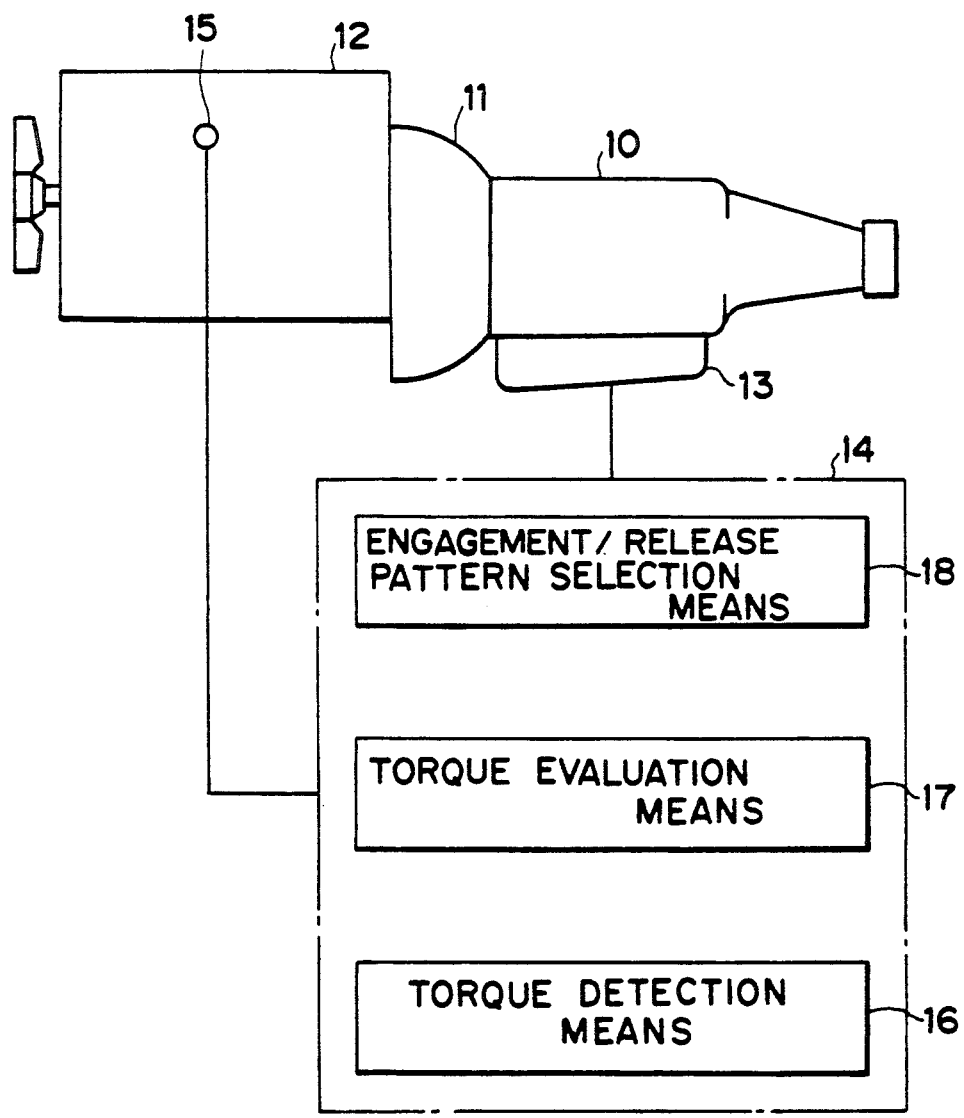
FIG. 1 is a block diagram showing the gist of the present invention.

In FIG. 1, an automatic transmission 10 is connected through a torque converter 11 to an engine 12. This automatic transmission 10 is equipped with a gear train and frictional engagement means, as will be described hereinafter, and is set to a plurality of gear stages in accordance with plural kinds of combination of engagement/release of the frictional engagement means and enabled to set a predetermined one of the gear stages in accordance with one of the combinations of engagement/release of the frictional engagement means.

These frictional engagement means are hydraulically engaged or released by a hydraulic control system 13, which in turn is controlled by a control system 14.

The hydraulic control system 13 is equipped, for example, with a plurality of (not-shown) solenoid valves which are turned ON or OFF to engage or release the predetermined frictional engagement means thereby to execute the shifts.

On the other hand, the control system 14 is composed mainly of a microcomputer, which is fed with various signals such as a signal coming from a throttle opening sensor 15 of the engine 12, a signal dictating a vehicle speed V, a signal dictating the number of revolution of the engine, a signal dictating a running mode, or a signal dictating a cooling water temperature. Moreover, the control system 14 is equipped with input torque detection means 16, torque evaluation means 17 and engagement/release pattern selection means 18.

The input torque detection means 16 detects torque inputted to the automatic transmission 10 on the basis of the signal outputted by the throttle opening sensor 15. On the other hand, the torque evaluation means 17 evaluates the magnitude of the detected input torque in accordance with a predetermined reference. Moreover, the engagement/release pattern selection means 18 selects the combination of engagement/release (i.e., the engagement/release pattern) of the frictional engagement means for setting a predetermined gear stage on the basis of the evaluation result of the input torque. If, for example, it is evaluated that the input torque is great, the engagement/release pattern selected is one for reducing the load torque of the frictional engagement means to be engaged. If, on the contrary, it is evaluated that the input torque is low, the engagement/release pattern selected is one for reducing the number of frictional engagement means to be switched for the shift even if the ratio of the load torque, which is to be applied to the frictional engagement means, to the input torque is great.

A more specific example of the system of the present invention will be described in the following.

In the example shown in FIG. 2, the gear train is composed mainly of three single-pinion type planetary gear sets 1, 2 and 3, which have their individual components connected, as follows. Specifically, the carrier 1C of the first planetary gear set 1 and the ring gear 3R of the third planetary gear set 3 are connected to rotate together, and the ring gear 2R of the second planetary gear set 2 and the carrier 3C of the third planetary gear set 3 are connected to rotate together. On the other hand, the sun gear 1S of the first planetary gear set 1 is connected at one hand through second clutch means K2 to the carrier 2C of the second planetary gear set 2 and at the other through fourth clutch means K4 to the sun gear 2S of the second planetary gear set 2. The carrier 2C of the second planetary gear set 2 is connected to the sun gear 3S of the third planetary gear set 3.

Incidentally, the connecting structure of each of the aforementioned components may be exemplified by one adopted in the existing automatic transmission, such as a quill or solid shaft or a suitable connecting drum.

An input shaft 4 is connected through (not-shown) power transmission means such as a torque converter or fluid coupling to the (not-shown) engine. Between this input shaft 4 and the ring gear 1R of the first planetary gear set 1, there is interposed first clutch means K1 for connecting the two components selectively. Between the input shaft 4 and the sun gear 1S of the first planetary gear set 1, on the other hand, there is interposed third clutch means K3 for connecting the two components selectively.

Incidentally, for practical purposes, each of the aforementioned clutch means K1 to K4 may be constructed of a multiple disc clutch or a one-way clutch, or their combination. Because of the restrictions upon the arrangement of the individual components, moreover, a suitable intermediate member such as a connecting drum can naturally be interposed as the connecting member for each of the clutch means K1 to K4.

On the other hand, brake means for blocking the rotations of the rotary components of the aforementioned planetary gear sets 1, 2 and 3 are exemplified by: second brake means B2 which is interposed between the carrier 2C of the second planetary gear set 2 and a transmission casing (as will be shortly referred to as the "casing") 6; and third brake means B3 which is interposed between the sun gear 2S of the second planetary gear set 2 and the casing 6. These brake means B2 and B3 may be constructed of a multiple disc brake or a band brake or their combination with a one-way clutch. Moreover, a suitable connecting member can naturally be interposed between those brake means B2 and B3 and either the members to be locked by the brake means B2 and B3 or the casing 6.

Moreover, an output shaft 5 for transmitting torque to a propeller shaft or a counter gear (both of which are not shown) is connected to the ring gear 2R of the second planetary gear set 2 and the carrier 3C of the third planetary gear set 3, which in turn are connected to each other.

Figure 2:
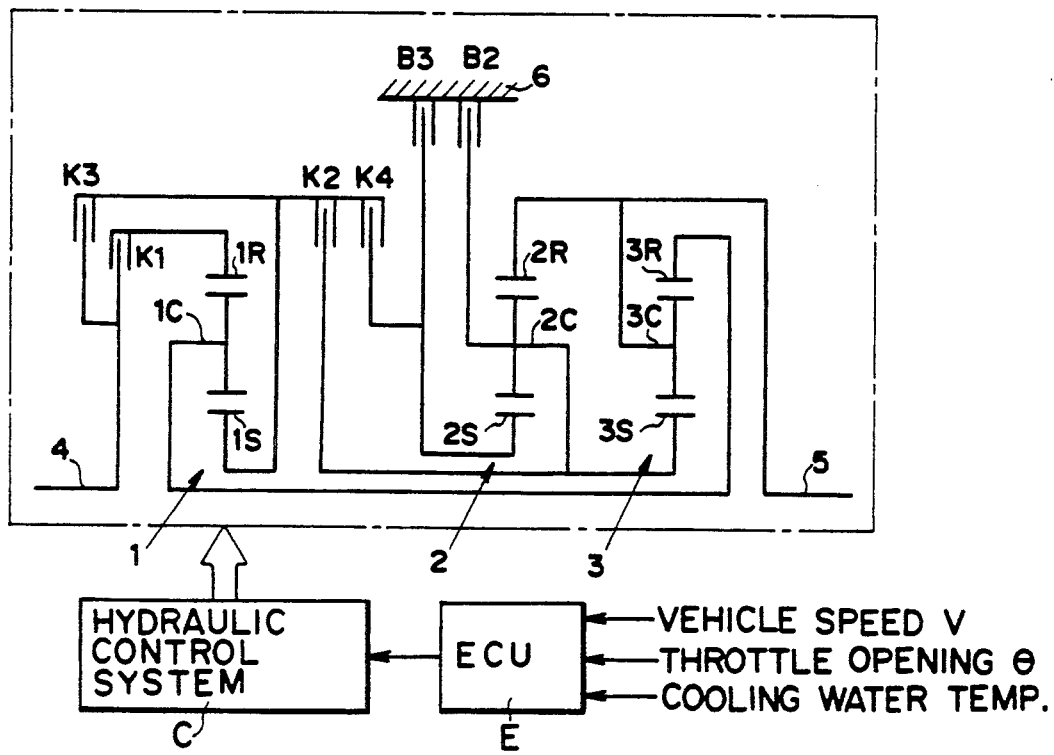
FIG. 2 is a skeleton diagram showing an automatic transmission according to an embodiment of the present invention.

In the automatic transmission having the structure shown in FIG. 2, too, a plurality of gear stages can be set by engaging/releasing the clutch means K1 to K4 and the brake means B2 and B3 suitably. These settings are controlled by a hydraulic control system C and an electronic control unit (ECU) E. This electronic control unit E computes a gear stage to be set on the basis of the input data such as the vehicle speed V, the throttle opening $\theta$, the running mode select signal or the cooling water temperature and outputs a signal to the hydraulic control system C. The electronic control unit E can be exemplified by the structure which is constructed mainly of a microcomputer according to the prior art. On the other hand, the hydraulic control system C pumps out or relieves the oil pressures for engaging/releasing the aforementioned clutch means and brake means. The hydraulic control system C to be adopted can be one which is known in the prior art to have pressure regulating valves, shift control valves and solenoid valves for actuating the shift control valves.

The gear stages to be set on the basis of the output of the aforementioned control system are forward eight stages and reverse one stage: major forward five having gear ratios near geometric series and reverse one; and additional 2.5th, 3.2th and 3.5th speeds. The clutch and brake application chart for setting those gear stages is enumerated in Table 1. Incidentally, in Table 1 and subsequent Tables: symbols ○ indicate the engaged state; blanks indicate the released state; and symbols * indicate that the corresponding component may be engaged. The components indicated the symbols * contain: those having their gear ratios and rotational states unchanged even if released; those having their gear ratios unchanged but their rotational states changed if released; and those having their gear ratios and rotational states unchanged even if released, if other means indicated at the symbols * are engaged. Moreover, columns having letters a, b and c indicate that the engagement/release patterns are such ones of the engagement/release patterns for setting the corresponding gear stages as are different in the numbers of revolution of the rotary components of the planetary gear sets.

In Table 2, moreover, the torques to be applied to the individual frictional engagement means, in case the gear ratios of the planetary gear sets 1, 2 and 3 shown in FIG. 2 are set at $\rho_1 = 0.450$, $\rho_2 = 0.405$, and $\rho_3 = 0.405$, are enumerated as the ratios to the input torque:

TABLE 1

|  | Clutch Means | | | | Brake Means | |
| --- | --- | --- | --- | --- | --- | --- |
|  | K1 | K2 | K3 | K4 | B2 | B3 |
| 1st | ○ |  |  | ○ | ○ |  |
| 2nd | ○ | ○ |  |  | ○ |  |
| 2.5th | ○ |  |  | ○ |  | ○ |
| 3rd | ○ |  | ○ |  | ○ |  |
| 3.2th | ○ | ○ |  |  |  | ○ |
| 3.5th | ○ |  | ○ |  |  | ○ |
| 4th | ○ | ○ | ○ | * |  |  |
|  | ○ | ○ | * | ○ |  |  |
|  | ○ | * | ○ | ○ |  |  |
|  | * | ○ | ○ | ○ |  |  |
| 5th |  | ○ | ○ |  |  | ○ |
| Rev |  |  | ○ | ○ | ○ |  |

TABLE 2

|  | Clutch Means | | | | Brake Means | |
| --- | --- | --- | --- | --- | --- | --- |
|  | K1 | K2 | K3 | K4 | B2 | B3 |
| 1st | 1.00 |  |  | 0.45 | 2.15 |  |
| 2nd | 1.00 | 0.45 |  |  | 1.04 |  |
| 2.5th | 1.00 |  |  | 0.45 |  | 0.62 |
| 3rd | 0.69 |  | 0.31 |  | 0.41 |  |
| 3.2th | 1.00 | 0.45 |  |  |  | 0.30 |
| 3.5th | 0.69 |  | 0.31 | * |  | 0.12 |
| 4th | 0.49 | 0.29 | 0.51 | * |  |  |
|  | 1.00 | 0.87 | * | 0.42 |  |  |
|  | 0.62 | * | 0.38 | 0.10 |  |  |
|  | * | 1.41 | 1.00 | 0.41 |  |  |
| 5th |  | 1.00 | 1.00 |  |  | 0.29 |
| Rev |  |  | 1.00 | 1.00 | 3.47 |  |

In the automatic transmission having the structure shown in FIG. 2, as is apparent from Tables 1 and 2, there are several kinds of engagement/release patterns for setting the 4th speed. In case this 4th speed is to be set, the engagement/release pattern is selected on the basis of the shifting controllability and the load torque of the frictional engagement means.

Figure 3:
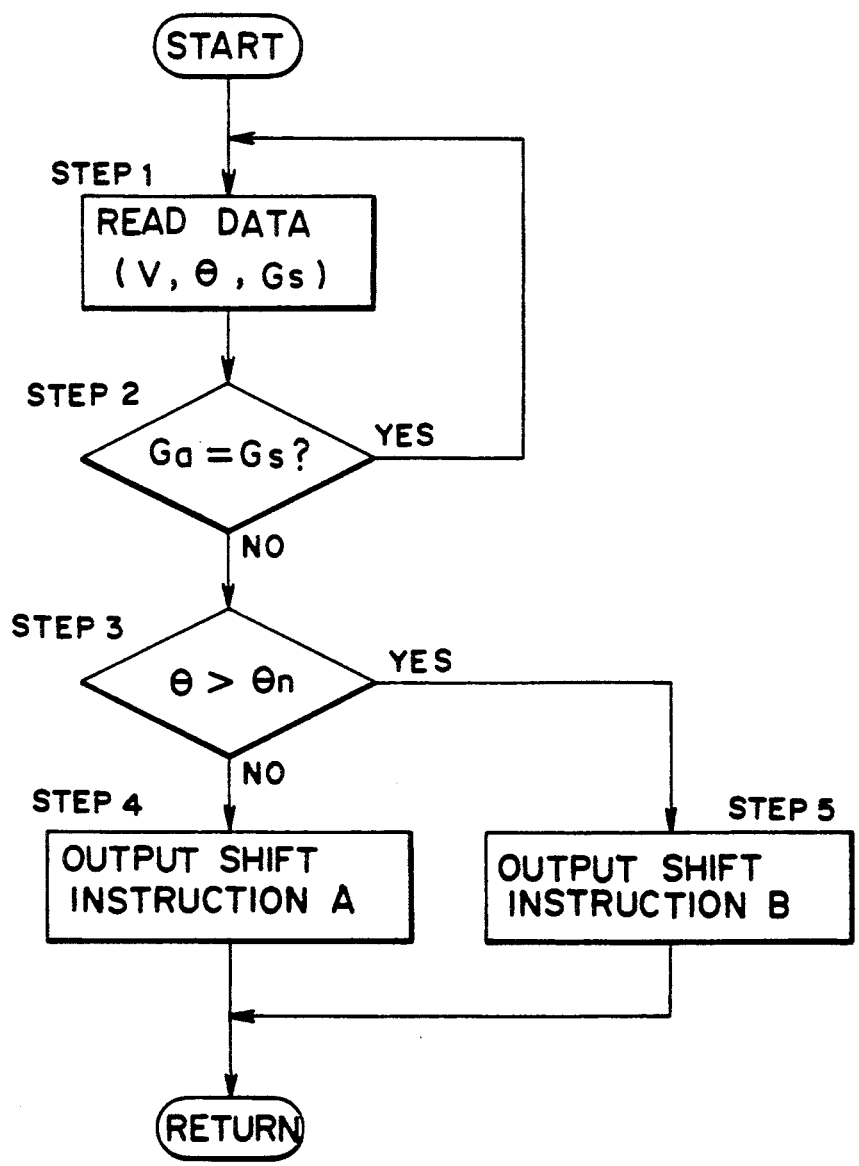
FIG. 3 is a flow chart showing one embodiment of a fundamental control routine to be executed in the present invention.

FIG. 3 is a flow chart showing the basic control routine for the controls. At Step 1, data such as the vehicle speed V, the throttle opening θ or the present gear stage Gs are read in. It is decided (at Step 2) whether or not an aimed target gear stage Ga determined mainly by the vehicle speed V and the throttle opening θ is identical to the present gear stage Gs. Then, the routine is returned to upstream of Step 1, if "YES", but is proceeded to Step 3 if "NO". It is decided at Step 3 whether or not the throttle opening θ is greater than a predetermined value $θ_n$. Since the engine output will increase with the increase in the throttle opening θ, the input torque to the gear train is decided at Step 3. If the input torque is lower than a constant value, namely, if the decision result of Step 3 is "NO", a shift instruction A is outputted (at Step 4). If, on the contrary, the input torque is greater than the constant value, namely, if the decision result of Step 3 is "YES", a shift instruction B is outputted (at Step 5). Here, the shift instructions A and B are those for setting the target gear stage Ga, which is to be determined by the vehicle speed V and the throttle opening θ, in accordance with the individually different engagement/release patterns. In the automatic transmission shown in FIG. 2, therefore, the predetermined gear stage is set according to the engagement/release patterns which are different in dependence upon the magnitude of the input torque to the gear train, as will be specifically described in the following.

Let the case be considered in which a shift from 1st to 4th speeds is decided from an increase in the vehicle speed or a decrease in the throttle opening. As is apparent from Table 1, the 1st speed is set by engaging the first clutch means K1, the fourth clutch means K4 and the second brake means B2, whereas the 4th speed is set by engaging at least any three of the first to fourth clutch means K1 to K4. Therefore, this shift from 1st to 4th speeds is executed by releasing the second brake means B2 and engaging the second clutch means K2 or the third clutch means K3. For this execution, as seen from Table 2, torque "0.87" is applied to the second clutch means K2 if the shift is effected by engaging the second clutch means K2. If the shift is effected by engaging the third clutch means K3, torque "0.38" is applied to the clutch K3. In case of the shift from the 1st to 4th speeds, a shift instruction for achieving the 4th speed by engaging the third clutch means K3 is named the aforementioned shift instruction A, and a shift instruction for achieving the 4th speed by engaging the second clutch means K2 is named the aforementioned shift instruction B. If the throttle opening θ is smaller than a predetermined value, namely, if the input torque to the gear train is small, the shift is executed by selecting the engagement/release pattern, in which the input torque to the clutch means has a large ratio to the input torque. If, on the contrary, the throttle opening θ is larger than the predetermined value, namely, if the input torque to the gear train is great, the shift is executed by selecting the engagement/release pattern, in which the torque to the clutch means is the smaller.

In case of a shift from 3rd to 4th speeds, the second brake means B2 is released, and the second clutch means K2 or the fourth clutch means K4 is engaged. In this case, moreover, the second clutch means K2 is subjected, if engaged, to torque "0.29", and the fourth clutch means K4 is subjected, if engaged to a torque "0.10". Here, for the ratio of "0.10" to the input torque, the actual torque to be applied to the fourth clutch means K4 is too low to control if the actual torque to the fourth clutch means K4 is low. Moreover, neither the second clutch means K2 nor the fourth clutch means K4 has a large ratio of the load torque to the input torque. In case of this shift, therefore, the shift instruction A to be outputted in case the throttle opening θ is smaller than a predetermined value is used for setting the 4th speed by engaging the second clutch means K2, and the shift instruction B to be outputted in case the throttle opening θ is larger than the predetermined value is used for setting the 4th speed by engaging the fourth clutch means K4. As a result, the actual torque to be applied to the fourth clutch means K4 is increased to such a high level because of the high ratio to the input torque that the oil pressure for the engagement can be easily controlled.

In case of a shift from 3.5th to 4th speeds, the third brake means B3 is released, and the second clutch means K2 or the fourth clutch means K4 is engaged. Therefore, the situations of this shift are similar to those of the shift from the 3rd to 4th speeds. In case the throttle opening θ and according the input torque are high, the shift instruction B is outputted to achieve the 4th speed by engaging the fourth clutch means K4. In case, on the other hand, the throttle opening θ and accordingly the input torque are low, the shift instruction A is outputted to achieve the 4th speed by engaging the second clutch means K2.

In case of a shift from 2.5th to 4th speeds, the third brake means B3 is released, and the second clutch means K2 or the fourth clutch means K4 is engaged. Therefore, the situations of the torques to be applied to the individual clutch means as a result of switching the clutch means are similar to those of the shift from the 1st to 4th speeds. In case the throttle opening θ and according the input torque are great, too, the shift instruction B is outputted to achieve the 4th speed by engaging the third clutch means K3. In case, on the other hand, the throttle opening θ and accordingly the input torque are low, the shift instruction A is outputted to achieve the 4th speed by engaging the second clutch means K2.

Figure 4:
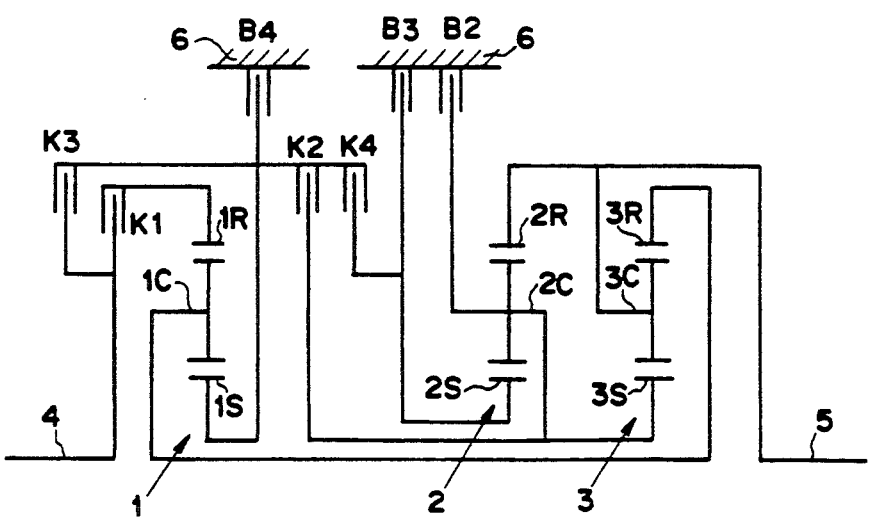
FIGS. 4 to 10 are skeleton diagrams showing gear trains according to other embodiments of the present invention, respectively.

FIG. 4 is a skeleton diagram showing a gear train according to another embodiment of the present invention. This gear train is constructed by adding fourth brake means B4 for locking the sun gear 1S of the first planetary gear set 1 to the structure shown in FIG. 2. The remaining structure is similar to that shown in FIG. 2.

The clutch and brake application chart for setting the individual gear stages of the automatic transmission shown in FIG. 4 are enumerated in Table 3, and the load torques of the individual frictional engagement means are enumerated in Table 4:

TABLE 3

|  | Clutch Means | | | | Brake Means | | |
| --- | --- | --- | --- | --- | --- | --- | --- |
|  | K1 | K2 | K3 | K4 | B2 | B3 | B4 |
| 1st | ○ |  |  | ○ | ○ |  | * |
| 2nd | ○ | ○ |  |  | * |  | ○ |
|  | ○ | * |  |  |  | ○ | ○ |
| 2.5th | ○ |  |  | ○ |  | ○ | * |
|  | ○ |  |  | ○ |  | * | ○ |
|  | ○ |  |  | * |  | ○ | ○ |
| 3rd | ○ |  | ○ |  | ○ |  |  |
| 3.2th | ○ | ○ |  |  |  | ○ |  |
| 3.5th | ○ |  | ○ |  |  | ○ |  |
| 4th | ○ | ○ | ○ | * |  |  |  |
|  | ○ | ○ | * | ○ |  |  |  |

TABLE 3-continued

| | Clutch Means | | | | Brake Means | | |
|---|---|---|---|---|---|---|---|
| | K1 | K2 | K3 | K4 | B2 | B3 | B4 |
| | O | * | O | O | | | |
| | * | O | O | O | | | |
| 5th | | O | O | | | O | |
| Rev | | | O | O | O | | |

TABLE 4

| | Clutch Means | | | | Brake Means | | |
|---|---|---|---|---|---|---|---|
| | K1 | K2 | K3 | K4 | B2 | B3 | B4 |
| 1st | 1.00 | | | 0.45 | 2.15 | | |
| 2nd | 1.00 | 0.45 | | | 1.04 | | * |
|  | 1.00 | 0.59 | | | * | | 1.04 |
|  | 1.00 | * | | | 0.59 | | 0.45 |
| 2.5th | 1.00 | | | 0.45 | | 0.62 | * |
|  | 1.00 | | | 0.17 | | * | 0.62 |
|  | 1.00 | | | * | | 0.17 | 0.45 |
| 3rd | 0.69 | | 0.31 | | 0.41 | | |
| 3.2th | 1.00 | 0.45 | | | | 0.30 | |
| 3.5th | 0.69 | | 0.31 | | | 0.12 | |
| 4th | 0.49 | 0.29 | 0.51 | * | | | |
|  | 1.00 | 0.87 | * | 0.42 | | | |
|  | 0.62 | * | 0.38 | 0.10 | | | |
|  | * | 1.41 | 1.00 | 0.41 | | | |
| 5th | | 1.00 | 1.00 | | | 0.29 | |
| Rev | | | 1.00 | 1.00 | 3.47 | | |

In the automatic transmission shown in FIG. 4, too, there is a room for selecting different engagement-/release patterns for setting a gear stage such as the 4th speed, so that the shift controls can be executed in accordance with the aforementioned flow chart shown in FIG. 3. Specifically, the shifts from 1st to 4th, 3rd to 4th, and 3.5th to 4th speeds can be accomplished in accordance with the input torques like the aforementioned controls in the automatic transmission shown in FIG. 2.

In the structure shown in FIG. 4, moreover, the shift from the 2.5th to 4th is achieved by releasing the third brake means B3 or the fourth brake means B4 and engaging the second clutch means K2 or the third clutch means K3. In this case, the second clutch means K2 is subjected, if engaged, to torque 0.87 times as high as the input torque, and the third clutch means K3 is subjected, if engaged, to torque 0.38 times as great as the input torque. As a result, the shift from 2.5th to 4th speeds is executed, as in the aforementioned automatic transmission shown in FIG. 2, by selecting the second clutch means K2 or the third clutch means K3 in accordance with the magnitude of the input torque.

Figure 5:
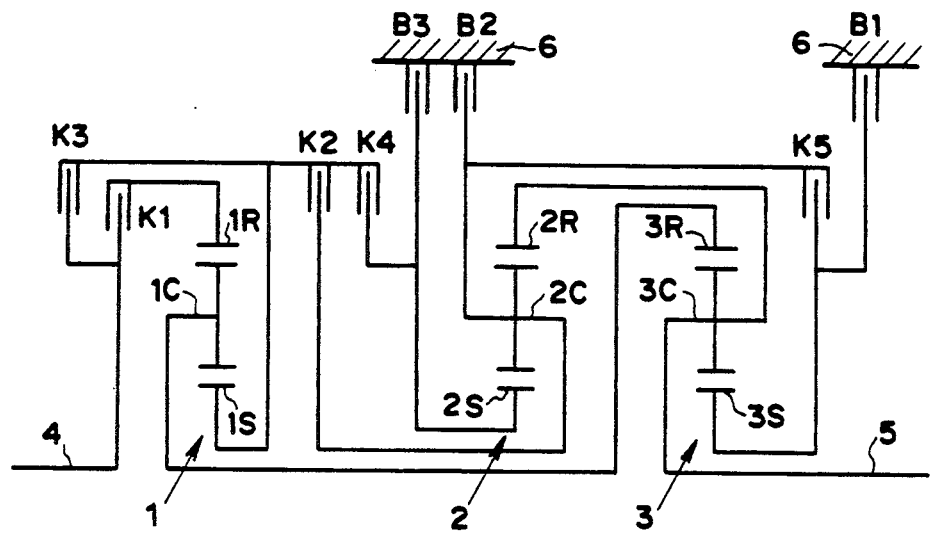
Figure 6:
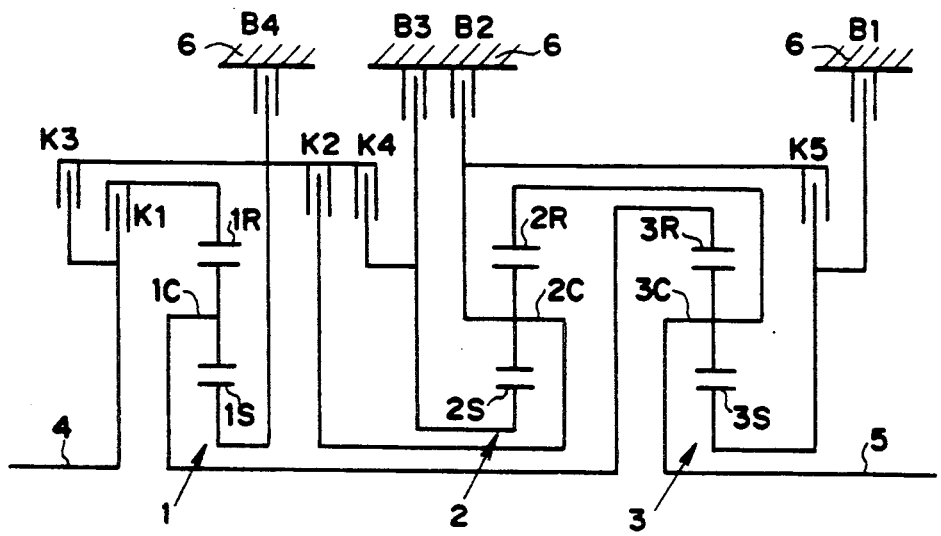

FIG. 5 is a skeleton diagram showing a gear train according to still another embodiment of the present invention. The structure shown herein is modified from the structure shown in FIG. 2 by interposing fifth clutch means K5 between the carrier 2C of the second planetary gear set 2 and the sun gear 3S of the third planetary gear set 3 and by providing first brake means B1 for locking the sun gear 3S of the third planetary gear set 3. The gear stages to be set by the automatic transmission shown in FIG. 5 and the engagement/release patters for setting those gear stages are enumerated in Table 5, and the load torques of the individual frictional engagement means are enumerated in Table 6:

TABLE 5

| | | Clutch Means | | | | | Brake Means | | |
|---|---|---|---|---|---|---|---|---|---|
| | | K1 | K2 | K3 | K4 | K5 | B1 | B2 | B3 |
| 1st | | O | | | O | O | O | * | |
| 2nd | a | O | O | | | O | O | * | O |
|  |  | O | O | | | O | * | O | O |
|  |  | O | O | | | * | O | O | O |
|  | b | O | | | O | | O | | O |
| 2.2th |  | O | O | | | | O | | O |
| 2.5th |  | O | | | O | O | | | O |
| 2.7th |  | O | O | | O | | O | | |
| 3rd | a | O | | O | | * | O | * | |
|  |  | O | | O | | O | * | O | |
|  | b | O | | O | | | O | | * |
|  | c | O | | O | * | | O | | |
|  | d | O | * | O | | | O | | |
| 3.2th |  | O | O | | | O | | O | |
| 3.5th |  | O | | O | | O | | O | |
| 4th | a | * | O | O | O | * | | | |
|  |  | O | O | O | * | O | | | |
|  |  | O | O | * | O | O | | | |
|  |  | O | * | O | O | O | | | |
|  | b | | O | O | O | | * | | |
| 5th | a | | O | O | | * | | | O |
|  | b | * | O | O | | | | * | O |
|  | c | | O | O | | | | * | O |
| Rev | a | | | O | O | * | * | O | |
|  |  | | | O | O | O | O | * | |
|  | b | * | | O | O | | | O | |

TABLE 6

| | | Clutch Means | | | | | Brake Means | | |
|---|---|---|---|---|---|---|---|---|---|
| | | K1 | K2 | K3 | K4 | K5 | B1 | B2 | B3 |
| 1st |  | 1.00 | | | 0.45 | 1.56 | 2.15 | * | |
|  |  | 1.00 | | | 0.45 | 0.59 | * | 2.15 | |
|  |  | 1.00 | | | 0.45 | * | 0.59 | 1.56 | |
| 2nd | a | 1.00 | 0.45 | | | 0.45 | 1.04 | * | |
|  |  | 1.00 | 0.45 | | | 0.59 | * | 1.04 | |
|  |  | 1.00 | 0.45 | | | * | 0.59 | 0.45 | |
|  | b | 1.00 | | | 0.45 | | 0.59 | | 0.45 |
| 2.2th |  | 1.00 | 0.45 | | | | 0.59 | | 0.13 |
| 2.5th |  | 1.00 | | | 0.45 | 0.59 | | | 0.62 |
| 2.7th |  | 1.00 | 0.63 | | 0.18 | | 0.59 | | |
| 3rd | a | 0.69 | | 0.31 | | * | 0.41 | * | |
|  |  | 0.69 | | 0.31 | | 0.41 | * | 0.41 | |
|  | b | 0.69 | | 0.31 | | | 0.41 | | * |
|  | c | 0.69 | | 0.31 | * | | 0.41 | | |
|  | d | 0.69 | * | 0.31 | | | 0.41 | | |
| 3.2th |  | 1.00 | 0.45 | | | 0.59 | | 0.30 | |
| 3.5th |  | 0.69 | | 0.31 | | 0.41 | | 0.12 | |
| 4th | a | * | 1.41 | 1.00 | 0.41 | * | | | |
|  |  | 0.49 | 0.29 | 0.51 | * | 0.29 | | | |
|  |  | 1.00 | 0.87 | * | 0.42 | 0.59 | | | |
|  |  | 0.62 | * | 0.38 | 0.10 | 0.36 | | | |
|  | b | | 1.41 | 1.00 | 0.41 | | * | | |
| 5th | a | | 1.00 | 1.00 | | * | | | 0.29 |
|  | b | * | 1.00 | 1.00 | | | | * | 0.29 |
|  | c | | 1.00 | 1.00 | | | | * | 0.29 |
| Rev | a | | | 1.00 | 1.00 | * | * | 3.47 | |
|  |  | | | 1.00 | 1.00 | 3.47 | 3.47 | * | |
|  | b | * | | 1.00 | 1.00 | | | 3.47 | |

The structure shown in FIG. 5 also has plural kinds of engagement/release patterns for setting a predetermined one of gear stages. Like the case of the embodiment shown in FIG. 2, the shift control can be accomplished to set the predetermined gear stage by the different engagement/release patterns according to the magnitude of the input torque. In case the 3rd speed set according to the pattern of column c is to be shifted to the 4th speed, the first brake means B1 is released, and the second clutch means K2 or the fifth clutch means K4 is engaged. Then, the load clutch of the second clutch means K2 is 1.41 times as high as the input torque, and the load torque of the fifth clutch means K5 is 0.36 times as great as the input torque. In case of the control shown in FIG. 3, therefore, the shift instruction for setting the 4th speed by engaging the second clutch means K2 is the shift instruction A, and the shift instruction for setting the 4th speed by engaging the fifth clutch means K5 is the shift instruction B. In case the throttle opening θ is lower than a predetermined value so that the input torque is low, the shift to the 4th speed is achieved by engaging the second clutch means K2. In case, on the other hand, the throttle opening θ is larger than the predetermined value so that the input torque is great, the shift to the 4th speed is achieved by engaging the fifth clutch means K5. Of these shifts, at the time of low input torque for engaging the second clutch means K2, not only the first clutch means K1 but also the fifth clutch means K5 is released after the 4th speed has been achieved. Thus, preparations can be made for the shift to the 5th speed without any strict control of the engagement/release timings to improve the responsiveness of shift execution to the accelerator working or the shift decision. In case, on the other hand, the torque capacity of the second clutch means K2 becomes short for the large opening, not only the fifth clutch means K5 but also the second clutch means K2 is engaged, and the first clutch means K1 is then released to effect the shift to the 5the speed by releasing the fourth clutch means K4.

As is now apparent from the description thus far made, the present invention can be applied to an automatic transmission which has plural kinds of combination patterns of engagement/release of the frictional engagement means for setting a predetermined gear stage. Other structures, to which the present invention can be applied, are shown in FIGS. 6 to 10. The gear stages to be set by the automatic transmission having the structure shown in FIG. 6 and the engagement/release patterns for setting those gear stages are enumerated in Table 7. The load torques to be applied to the individual frictional engagement means are enumerated in Table 8. Likewise, Table 9 enumerates the clutch and brake application chart of the automatic transmission shown in FIG. 7, and Table 10 enumerates the load torques of the individual frictional engagement means. Table 11 enumerates the clutch and brake application chart of the automatic transmission shown in FIG. 8, and Table 12 enumerates the load torques of the individual frictional engagement means. The engagement/release patterns to be selected in accordance with the magnitudes of the input torques can be easily found out from those Tables 7 to 12:

TABLE 9-continued

| | | Clutch Means | | | | | Brake Means | | |
|---|---|---|---|---|---|---|---|---|---|
| | K1 | K2 | K3 | K4 | K5 | B1 | B2 | B3 |
| 3.2th | * | ○ | ○ | ○ | | ○ | | |
| 3.5th | ○ | ○ | | ○ | | | | ○ |
| | ○ | | ○ | | ○ | | | ○ |
| 4th | | ○ | ○ | * | ○ | | | ○ |
| | | ○ | | * | ○ | | | ○ |
| | * | ○ | | ○ | ○ | | | ○ |
| 4.5th | | ○ | ○ | | | | | ○ |
| 5th | | ○ | ○ | | | ○ | | ○ |
| Rev | | | ○ | ○ | ○ | | * | |
| | | | ○ | ○ | ○ | * | | ○ |
| | | | ○ | ○ | * | | ○ | |

TABLE 10

| | | Clutch Means | | | | | Brake Means | | |
|---|---|---|---|---|---|---|---|---|---|
| | | K1 | K2 | K3 | K4 | K5 | B1 | B2 | B3 |
| 1st | | 1.00 | | | 0.45 | 1.24 | 2.15 | * | |
| | | 1.00 | | | 0.45 | 0.91 | * | 2.15 | |
| | | 1.00 | | | 0.45 | * | 0.91 | 1.24 | |
| 2nd | a | 1.00 | 0.45 | | | 0.45 | 1.04 | * | |
| | | 1.00 | 0.45 | | | 0.59 | * | 1.04 | |
| | | 1.00 | 0.45 | | | * | 0.59 | 0.45 | |
| | b | 1.00 | | | 0.45 | | 0.59 | | 0.45 |
| 2.2th | | 1.00 | 0.45 | | | | 0.47 | | 0.16 |
| 2.5th | | 1.00 | | | 0.45 | 0.47 | | | 0.62 |
| 3rd | a | 0.69 | | 0.31 | | * | 0.41 | * | |
| | | 0.69 | | 0.31 | | 0.41 | * | 0.41 | |
| | b | 0.69 | | 0.31 | | | 0.41 | | * |
| | c | 0.69 | * | 0.31 | * | | 0.41 | | |
| | | 1.00 | 0.71 | * | 0.26 | | 0.41 | | |
| | | * | 1.57 | 1.00 | 0.57 | | 0.41 | | |
| 3.2th | | 1.00 | 0.45 | | | 0.38 | | | 0.30 |
| 3.5th | | 0.69 | | 0.31 | | 0.32 | | | 0.12 |
| 4th | | 0.49 | 0.29 | 0.51 | * | 0.29 | | | |
| | | 1.00 | 0.86 | * | 0.42 | 0.29 | | | |
| | | 0.62 | * | 0.38 | 0.10 | 0.29 | | | |
| | | * | 1.40 | 1.00 | 0.40 | 0.29 | | | |
| 4.5th | | | 1.00 | 1.00 | | | 0.26 | | 0.36 |
| 5th | | | 1.00 | 1.00 | | | | 0.20 | 0.29 |
| Rev | | | | 1.00 | 1.00 | 2.76 | 3.47 | * | |
| | | | | 1.00 | 1.00 | 0.71 | * | 3.47 | |
| | | | | 1.00 | 1.00 | * | 0.71 | 2.76 | |

TABLE 11

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 1st | | ○ | | | ○ | ○ | ○ | * | | |
| | | ○ | | | ○ | ○ | * | ○ | | |
| | | ○ | | | ○ | * | ○ | ○ | | |
| 2nd | a | ○ | ○ | | | ○ | ○ | * | | * |
| | | ○ | ○ | | | ○ | * | ○ | | * |
| | | ○ | ○ | | | * | ○ | ○ | | |
| | b | ○ | | | ○ | | ○ | * | | ○ |
| 2.2th | | ○ | ○ | | | | ○ | * | | ○ |
| 2.5th | | ○ | | | ○ | ○ | | * | | ○ |
| 3rd | a | ○ | | ○ | | * | ○ | * | | |
| | | ○ | | ○ | | ○ | * | ○ | | |
| | b | ○ | | ○ | | | ○ | | * | |
| | c | ○ | * | ○ | * | | ○ | | | |
| 3.2th | | ○ | ○ | | | ○ | | | | ○ |
| 3.5th | | ○ | | ○ | | ○ | | | | ○ |
| 4th | | ○ | ○ | ○ | * | ○ | | | | |
| | | ○ | ○ | * | ○ | ○ | | | | |
| | | ○ | * | ○ | ○ | ○ | | | | |
| | | * | ○ | ○ | ○ | ○ | | | | |
| 4.5th | | | ○ | ○ | | | ○ | | | ○ |

TABLE 11-continued

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 5th | | ○ | ○ | | | ○ | | | ○ | |
| Rev | | | | ○ | ○ | ○ | ○ | * | | |
| | | | | ○ | ○ | ○ | * | ○ | | |
| | | | | ○ | ○ | * | | ○ | | |

TABLE 12

| | | Clutch Means | | | | | Brake Means | | | |
|---|---|---|---|---|---|---|---|---|---|---|
| | | K1 | K2 | K3 | K4 | K5 | B1 | B2 | B3 | B4 |
| 1st | | 1.00 | | | 0.45 | 1.24 | 2.15 | * | | |
| | | 1.00 | | | 0.45 | 0.91 | * | 2.15 | | |
| | | 1.00 | | | 0.45 | * | 0.91 | 1.24 | | |
| 2nd | a | 1.00 | 0.45 | | | 0.45 | 1.04 | * | | * |
| | | 1.00 | 0.45 | | | 0.59 | * | 1.04 | | * |
| | | 1.00 | 0.45 | | | 0.59 | * | * | | 1.04 |
| | | 1.00 | 0.45 | | | * | 0.59 | 0.45 | | * |
| | | 1.00 | * | | | | 0.59 | * | | 0.45 |
| | | 1.00 | | | | 0.59 | * | 0.59 | | 0.45 |
| | b | 1.00 | | | 0.45 | | 0.59 | | 0.45 | * |
| | | 1.00 | | | * | | 0.59 | | * | 0.45 |
| 2.2th | | 1.00 | 0.45 | | | | 0.47 | | | 0.16 |
| 2.5th | | 1.00 | | | 0.45 | 0.47 | | | 0.62 | * |
| | | 1.00 | | | 0.17 | 0.47 | | | * | 0.62 |
| | | 1.00 | | | * | 0.47 | | | 0.17 | 0.45 |
| 3rd | a | 0.69 | | 0.31 | | * | 0.41 | * | | |
| | | 0.69 | | 0.31 | | 0.41 | * | 0.41 | | |
| | b | 0.69 | | 0.31 | | | 0.41 | | * | |
| | c | 0.69 | * | 0.31 | * | | 0.41 | | | |
| | | 1.00 | 0.71 | * | 0.26 | | 0.41 | | | |
| | | * | 1.57 | 1.00 | 0.57 | | 0.41 | | | |
| 3.2th | | 1.00 | 0.45 | | | 0.38 | | | | 0.30 |
| 3.5th | | 0.69 | | 0.31 | | 0.32 | | | | 0.12 |
| 4th | | 0.49 | 0.29 | 0.51 | * | 0.29 | | | | |
| | | 1.00 | 0.86 | * | 0.42 | 0.29 | | | | |
| | | 0.62 | * | 0.38 | 0.10 | 0.29 | | | | |
| | | * | 1.40 | 1.00 | 0.40 | 0.29 | | | | |
| 4.5th | | | 1.00 | 1.00 | | | 0.26 | | 0.36 | |
| 5th | | | 1.00 | 1.00 | | | | 0.20 | 0.29 | |
| Rev | | | | 1.00 | 1.00 | 2.76 | 3.47 | * | | |
| | | | | 1.00 | 1.00 | 0.71 | * | 3.47 | | |
| | | | | 1.00 | 1.00 | * | 0.71 | 2.76 | | |

Figure 9:
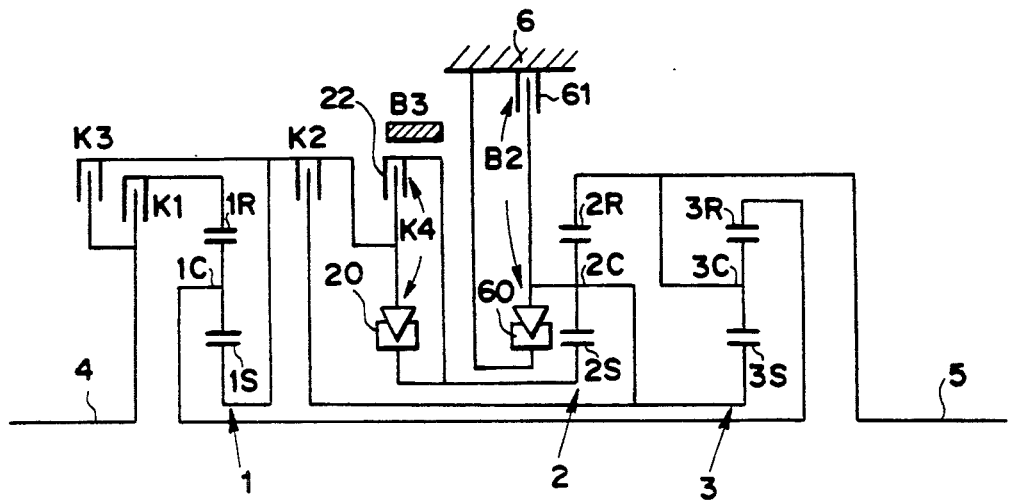

The gear train shown in FIG. 9 is modified from that shown in FIG. 2: by composing the fourth clutch means K4 of a one-way clutch 20 and a multiple disc clutch 22 held in parallel relation to each other; by composing the second brake means B2 of a one-way clutch 60 and a multiple disc brake 61 held in parallel relation to each other; and by composing the third brake means B3 of a band brake.

Figure 7:
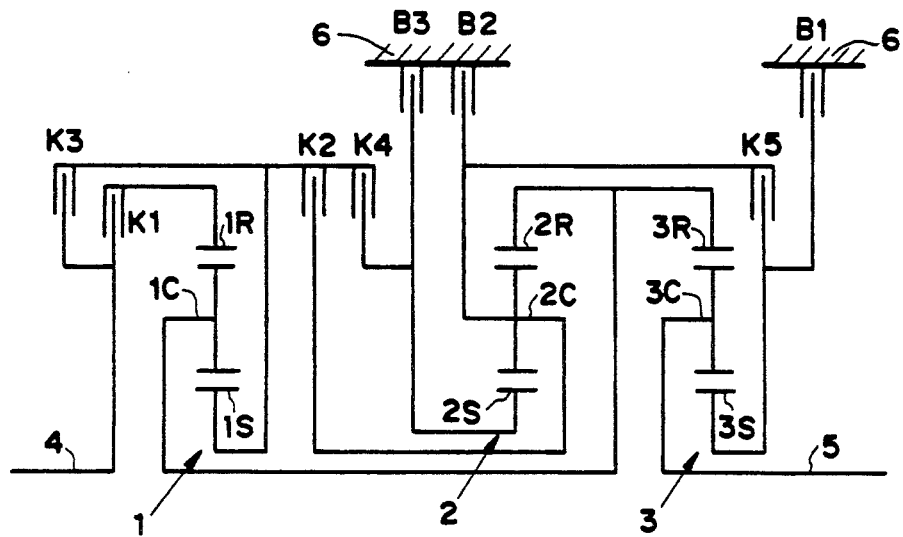
Figure 8:
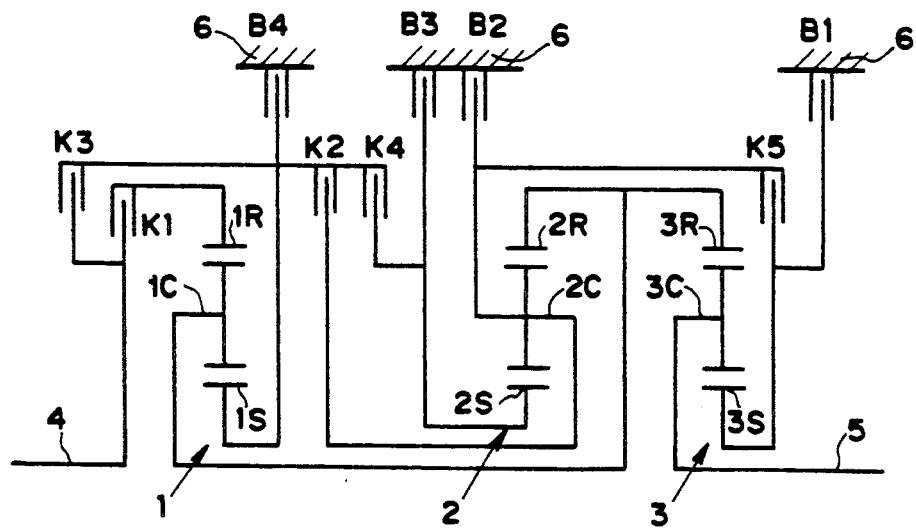
Figure 10:
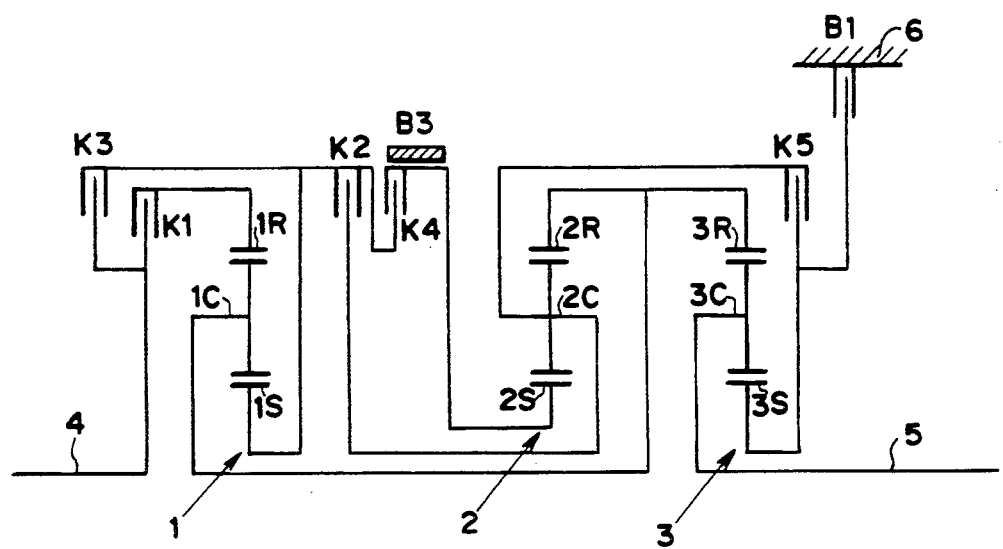

On the other hand, the gear train shown in FIG. 10 is modified from that shown in FIG. 7 by omitting the second brake means B2 and by composing the third brake means B3 of a band brake.

Even the automatic transmission having the gear train shown in FIGS. 9 or 10 has gear stages, for which plural kinds of engagement/release patterns are present, so that the gear stages can be controlled like the foregoing embodiments.

Although the foregoing individual embodiments have been described by exemplifying the shifting case to the 4th speed, the present invention can also be applied to the case, in which the automatic transmission is shifted to another gear stage having plural kinds of engagement/release patterns. In the foregoing embodiments, moreover, the individual frictional engagement means are symbolized to have the multiple disc structure. However, the automatic transmission of the present invention can use the frictional engagement means which are composed of a one-way clutch, a multiple disc clutch, or their combination, or a band brake. Still moreover, the foregoing embodiments are exemplified by selecting the engagement/release patterns at the shifting time, but the engagement/release patterns may be switched while the gear stage is being maintained, according to the present invention. In addition, the present invention can be applied to the automatic transmissions having the structures which are disclosed in the specifications and drawings of our Japanese Patent Applications Nos. Hei 1-185151, Hei 1-185152, Hei 1-186991, Hei 1-186992, Hei 1-205478 and Hei 1-280957.

What is claimed is:

1. In an automatic transmission having a gear train to be set to a plurality of gear stages of different gear ratios in accordance with the engagement/release states of a plurality of frictional engagement means, wherein said gear train is enabled to set a predetermined gear stage in accordance with plural combinations of the engagement/release of said frictional engagement means, a shift control system comprising:

input torque detection means for detecting input torque to be inputted to said gear train;

torque evaluation means for evaluating the level of said input torque; and engagement/release pattern selection means for selecting one of the plural combinations of engagement/release of said frictional engagement means for setting said predetermined gear stage, on the basis of the result of the input torque evaluated by said torque evaluation means.

2. A shift control system according to claim 1, wherein said input torque detection means includes a throttle opening sensor.

3. A shift control system according to claim 2, wherein said torque evaluation means is adapted to compare the throttle opening detected by said throttle opening sensor with a predetermined reference value.

4. A shift control system according to claim 1, wherein said engagement/release pattern selection means is adapted to select, in case said input torque is great, the combination of engagement/release of said frictional engagement means, in which the ratio of the load torque to be applied to the frictional engagement means to be engaged to said input torque is low.

5. A shift control system according to claim 1, wherein said engagement/release pattern selection means is adapted to select, in case said input torque is low, the combination of engagement/release of said frictional engagement means, in which the ratio of the load torque to be applied to the frictional engagement means to be engaged to said input torque is great.

6. A shift control system according to claim 5, wherein said engagement/release pattern selection means is adapted to select, after said combination has been selected, another combination, in which the number of said frictional engagement to be selected at the time of a shift from said predetermined gear ratio to another is small.

7. A shift control system according to claim 1, wherein said gear train comprises:

an input shaft;
   an output shaft;
   a first planetary gear set including a first sun gear, a first ring gear, a pinion gear meshing with said first sun gear and said first ring gear, and a first carrier supporting said pinion gear;
   a second planetary gear set including a second sun gear connected integrally or selectively to said first sun gear, a second ring gear, a pinion gear meshing with said sun gear and said second ring gear, and a second carrier supporting said pinion gear; and
   a third planetary gear set including a third sun gear connected integrally or selectively to said second carrier, a third ring gear connected integrally or selectively to said first carrier, a pinion gear meshing with said third sun gear and said third ring gear, and a third carrier supporting said pinion gear and connected integrally or selectively to said second ring gear.

8. A shift control system according to claim 7, wherein said frictional engagement means includes:

first clutch means for connecting said input shaft and said first ring selectively;
   second clutch means for connecting said first sun gear and said second carrier selectively;
   third clutch means for connecting said input shaft and said first sun gear selectively;
   fourth clutch means for connecting said first sun gear and said second sun gear selectively;
   first brake means for stopping the rotation of said second carrier selectively; and
   second brake means for stopping the rotation of said second sun gear selectively, and
   wherein said output shaft is connected to said second ring gear or said third carrier.

9. A shift control system according to claim 8, wherein said fourth clutch means is composed of a one-way clutch and a multiple disc clutch held in parallel relation to each other,
   wherein said first brake means is composed of a multiple disc clutch and a one-way clutch held in parallel relation to each other, and
   wherein said second brake means is composed of a band brake.

10. A shift control system according to claim 1, wherein said gear train comprises:

an input shaft;
    an output shaft;
    a first planetary gear set including a first sun gear, a first ring gear, a pinion gear meshing with said first sun gear and said first gear, and a first carrier supporting said pinion gear;
    a second planetary gear set including a second sun gear connected integrally or selectively to said first sun gear, a second ring gear connected integrally or selectively to said first carrier, a pinion gear meshing with said second sun gear and said ring gear, and a second carrier supporting said pinion gear; and
    a third planetary gear set including a third sun gear connected integrally or selectively to said second carrier, a third ring gear connected integrally or selectively to said second ring gear, a pinion gear meshing with said third sun gear and said third ring gear, and a third carrier supporting said pinion gear.

11. A shift control system according to claim 10, wherein said frictional engagement means includes:

first clutch means for connecting said input shaft and said first ring gear selectively;
    second clutch means for connecting said first sun gear and said second carrier selectively;
    third clutch means for connecting said input shaft and said first sun gear selectively;
    fourth clutch means for connecting said first sun gear and said second sun gear selectively;

fifth clutch means for connecting said second carrier and said third sun gear selectively;

second brake means for stopping the rotation of said second sun gear selectively; and third brake means for stopping the rotation of said third sun gear selectively, and wherein said output shaft is connected to said third carrier.

12. A shift control system according to claim 11, wherein said second brake means is composed of a band brake.

13. In an automatic transmission having a gear train to be set to a plurality of gear stages of different gear ratios in accordance with the engagement/release states of a plurality of frictional engagement means, wherein said gear train is enabled to set a predetermined gear stage in accordance with plural combinations of the engagement/release of said frictional engagement means, a shift control method comprising:

an input torque detection step of detecting an input torque to be inputted to said gear train;

a torque evaluation step of evaluating the level of said input torque; and an engagement/release pattern selection step of selecting one of the plural combinations of engagement/release of said frictional engagement means for setting said predetermined gear stage, on the basis of the result of the input torque evaluated by said torque evaluation means.

14. A shift control method according to claim 13, wherein said torque evaluation step compares the throttle opening detected by a throttle opening sensor with a predetermined reference value.

15. A shift control method according to claim 13, wherein said engagement/release pattern selection step selects, in case said input torque is great, the combination of engagement/release of said frictional engagement means, in which the ratio of the load torque to be applied to the frictional engagement means to be engaged to said unput torque is low.

16. A shift control method according to claim 13, wherein said engagement/release pattern selection step selects, in case said input torque is low, the conbination of engagement/release of said frictional engagement means, in which the ratio of the load torque to be applied to the frictional engagement means to be engaged to said input torque is great.

17. A shift control method according to claim 16, wherein said engagement/release pattern selection step selects, after said combination has been selected, another combination, in which the number of said frictional engagement means to be selected at the time of a shift from said predetermined gear ratio to another is small.

* * * * *

UNITED STATES PATENT AND TRADEMARK OFFICE
CERTIFICATE OF CORRECTION

PATENT NO. : 5,133,229

DATED : JULY 28, 1992

INVENTOR(S) : TOSHIYUKI ASADA ET AL

It is certified that error appears in the above-identified patent and that said Letters Patent is hereby corrected as shown below:

Column 15:
In Claim 6, line 5, after "engagement" insert --means--.
Column 16:
In Claim 8, line 4, after "ring" insert --gear--.

In Claim 10, line 7, after "first" (first occurrence) insert --ring--.
Column 18:
In Claim 15, line 7, change "unput" to --input--.

Signed and Sealed this

Fifteenth Day of February, 1994

Attest:

BRUCE LEHMAN

Attesting Officer

Commissioner of Patents and Trademarks